(12) United States Patent
Stewart et al.

(10) Patent No.: US 8,215,452 B2
(45) Date of Patent: Jul. 10, 2012

(54) EXTENDABLE LADDER FOR TRAILER, MOTOR HOME, OR OTHER VEHICLE

(76) Inventors: Robert Gail Stewart, Andrews, TX (US); James Edward Stewart, Andrews, TX (US)

( * ) Notice: Subject to any disclaimer, the term of this patent is extended or adjusted under 35 U.S.C. 154(b) by 961 days.

(21) Appl. No.: 11/957,007

(22) Filed: Dec. 14, 2007

(65) Prior Publication Data
US 2009/0152046 A1 Jun. 18, 2009

(51) Int. Cl.
E06C 5/04 (2006.01)
(52) U.S. Cl. .................................. 182/207; 182/127
(58) Field of Classification Search .......... 182/127, 182/93, 207
See application file for complete search history.

(56) References Cited

U.S. PATENT DOCUMENTS

| | | | |
|---|---|---|---|
| 650,604 A * | 5/1900 | Howard | 182/207 |
| 1,350,242 A * | 8/1920 | Saget | 182/24 |
| 2,246,985 A | 6/1941 | Pelligrini | |
| 2,794,583 A | 6/1957 | Ernst | |
| 2,840,290 A | 6/1958 | Roberts | |
| 3,172,499 A | 3/1965 | Stairs | |
| 3,337,001 A * | 8/1967 | Huska et al. | 182/207 |
| 3,343,630 A * | 9/1967 | Redman et al. | 182/209 |
| 3,347,340 A * | 10/1967 | Huska et al. | 182/207 |
| 3,402,788 A * | 9/1968 | Redman | 182/207 |
| 3,454,135 A * | 7/1969 | Montgomery et al. | 182/209 |
| 3,480,107 A | 11/1969 | Goodhue | |
| 3,491,853 A * | 1/1970 | Stillman, Jr. | 182/207 |
| 3,502,175 A * | 3/1970 | Bullock | 182/211 |
| 3,935,926 A * | 2/1976 | Butler | 182/208 |
| 4,079,815 A | 3/1978 | Cormier | |
| 4,151,895 A | 5/1979 | Rasada | |
| 4,161,997 A | 7/1979 | Norman | |
| 4,408,680 A * | 10/1983 | Ross | 182/68.1 |
| 5,024,293 A * | 6/1991 | Yang et al. | 182/93 |
| 5,469,933 A | 11/1995 | Thomason | |
| 5,518,357 A | 5/1996 | Ziaylek | |
| 5,758,745 A * | 6/1998 | Beggs et al. | 182/207 |
| 6,378,654 B1 * | 4/2002 | Ziaylek et al. | 182/97 |
| 6,578,905 B1 | 6/2003 | Buchanan | |
| 6,820,723 B2 | 11/2004 | Huber | |
| 7,100,740 B2 | 9/2006 | Newton | |
| 7,137,479 B2 * | 11/2006 | Ziaylek et al. | 182/127 |

* cited by examiner

*Primary Examiner* — Katherine w Mitchell
*Assistant Examiner* — Daniel Cahn
(74) *Attorney, Agent, or Firm* — McNeely, Hare & War, LLP; William D. Hare, Esq.

(57) ABSTRACT

The invention relates to an extendable ladder configured to extend a second ladder segment relative to a first ladder segment. The ladder includes a first ladder segment, a second ladder segment, and at least two slider cups. When the ladder is mounted to a surface, the ladder can be moved from a generally vertical orientation to an angled orientation of between greater than 60 degrees and approximately 90 degrees away from the horizontal reference. The ladder may be mounted to one or more of a vehicle, a building, and a piece of equipment. The vehicle may be one or more of a trailer, recreational vehicle, truck, and bus.

18 Claims, 6 Drawing Sheets

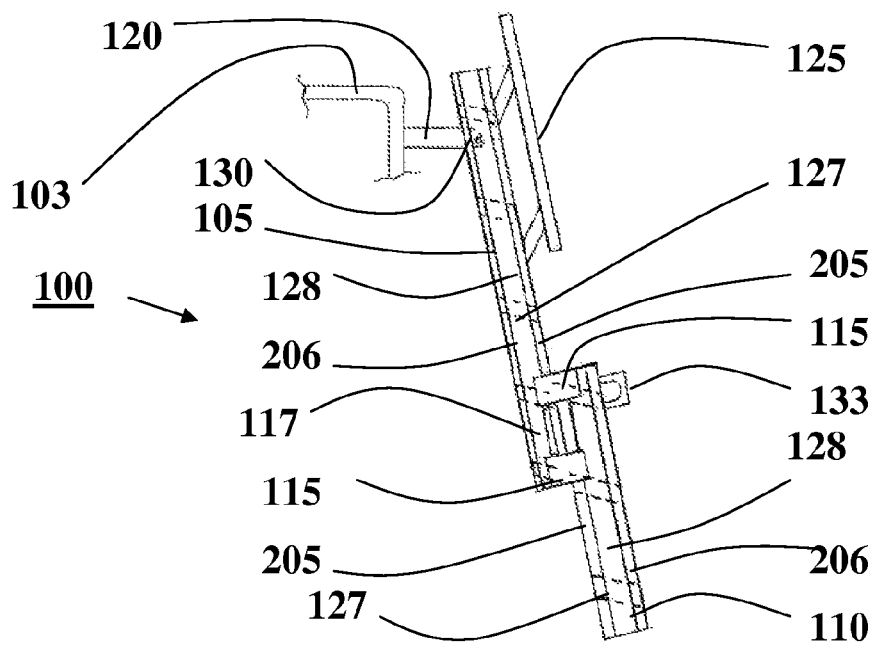
Fig. 1
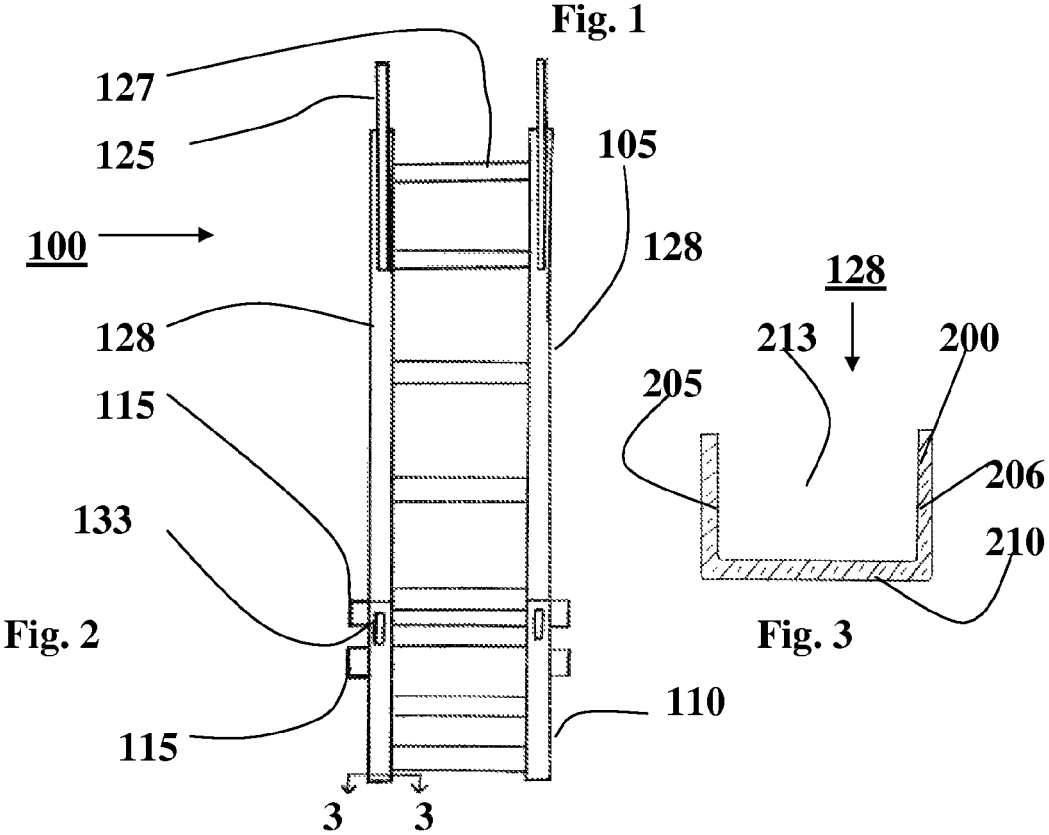
Fig. 2
Fig. 3

EXTENDABLE LADDER FOR TRAILER, MOTOR HOME, OR OTHER VEHICLE

TECHNICAL FIELD

The field of the invention generally relates to extendable ladders mounted to trailers, motor homes and the like for providing improved safety and ease when accessing the roof of the trailer or vehicle.

BACKGROUND

The inventor has observed that there is a need for improving the safety and ease by which individuals access the roof or top of a vehicle, for example, to remove hay or other objects from a horse trailer, to access items on top of a motor home, and the like. In general, current trailers and motor homes typically have a ladder mounted to a side or rear wall of the vehicle. The ladder includes a frame with upper ends and lower ends that mount to the wall. As a result, the frame is approximately vertical and does not extend to the ground. The prior art discloses numerous other methods of mounting ladders to objects such as vehicles.

For example, U.S. Pat. No. 6,378,654 discloses ladders attached to vertical surfaces, such as a vehicle. The ladder is mounted at its upper end to the vehicle and can pivot outwardly from the vehicle by a scissors-like mechanism at its base that locks the ladder into an extended, inclined position and folds up for a vertical, storage position. The base of the ladder further includes an extension that swings outwardly and downwardly to extend the length of the ladder.

U.S. Pat. No. 6,820,723 discloses a ladder that is pivotally mounted at its base to a mounting frame that rests on the ground as well as being bolted to a vehicle. The ladder is held in a vertically inclined position by a pair of cables extending from a winch in the truck. The ladder is mounted to a mounting frame that appears to be mounted to a trailer hitch of the vehicle.

U.S. Pat. No. 5,469,933 discloses a ladder and frame mounted to a truck. The frame and ladder are assembled adjacent to the truck so that the ladder can be vertically inclined away from the truck. The frame remains attached to the truck and provides stability to the ladder.

U.S. Pat. No. 4,408,680 discloses a ladder that is pivotally mounted at its base to mounting bolts on the bumper of a truck. The ladder is held in a vertically inclined position by a pair of cables extending from a bolt mounted to the bed walls of the truck. The ladder illustrated in the patent is a conventional extension ladder in which two segments slide past each other.

U.S. Pat. No. 2,840,290 discloses a telescoping ladder that is mounted to the roof of a vehicle or a bunk bed. The ladder includes a first section that slides within a second section. The ladder slides within a frame which is mounted to the vehicle roof or bed. The ladder can pivot with respect to the frame with the ladder section extended from until it reaches the ground.

U.S. Pat. No. 2,794,583 discloses a pivoting ladder that is mounted to a printing press. The ladder is mounted to a pair of bolts at its upper end. At its lower end, the ladder is mounted to a pair of bars that are slidably connected to slotted flanges attached to the printing press. The bars may be moved to extend out the base of the ladder.

It also is known to use mobile or portable stairs that have two sections that move relative to each other to allow one portable stair apparatus to be used with platforms of different heights. These portable stairs can be used in numerous applications, for example, in warehouses and box stores to access items stored on high shelves and in the chemical and oil industry to access platforms on chemical processing equipment and oil wells. These portable stairs generally are not permanently fixed to the platform or shelf but instead are moved around as needed to access the elevated shelves or platforms.

Other portable stairs provide the user the ability to purchase one portable stair apparatus and use it with different applications, e.g., a worker in the oil drilling industry may take this from one oil drilling platform to another as need. Thus, the worker may leave the portable stair apparatus on a particular oil drilling platform for one day or months at a time. Notably, the stair apparatus is not permanently fixed or mounted to the platform but instead is retained to the platform by using hooks that clip onto the platform.

These stairs are regulated by the Occupational Safety and Health Administration (OSHA) at 29 CFR 1910.29 (Manually Propelled Mobile Ladder Stands and Scaffolds (Towers)) (2007), which requires that the slope of the steps section be between a minimum of 55 degrees and a maximum of 60 degrees measured from the horizontal. In contrast, OSHA regulations at 29 CFR 1910.24 (2007) for fixed stairs require the angle of the stairway rise to be between 30 degrees and 50 degrees measured from the horizontal. It should be noted that because such stairs are used at a slight angle, it is not typically a problem for the two sections to slide past each other. For example, if the stairs including of sliding sections that are made of aluminum, the two sliding sections will be expected to slide past each other with relative ease and avoid the binding or catching that would be expected if the two sliding sections were at a more extreme angle.

SUMMARY

In one general aspect there is provided an extendable ladder configured to extend a second ladder segment relative to a first ladder segment. The ladder includes a first ladder segment, a second ladder segment, and at least two slider cups.

The first ladder segment includes two beams and each beam includes at least a first leg and a second leg with the first leg and the second leg being joined lengthwise to form an angle between the first leg and the second leg. One or more rungs are connected to and extend between the first leg of the first beam and the first leg of the second beam. One or more mounting arms extend from the beams with the mounting arms being configured at one end to be permanently mounted to a surface and being pivotally attached at another end to the beam whereby the beams can pivot with respect to the mounting arms to vary an angle formed between the mounting arm and the beam.

The second ladder segment includes two beams and each beam includes at least a first leg and a second leg with the first leg and the second leg being joined lengthwise to form an angle between the first leg and the second leg. One or more rungs are connected to and extend between the first leg of the first beam and the first leg of the second beam.

The slider cups are mounted to either or both of the first ladder segment and the second ladder segment and include a first wall and a second wall being positioned in parallel planes and connected by at least a third wall passing through a plane generally perpendicular to the first and second walls. The first wall is mounted to either or both of the first leg and the second leg of one beam with the third wall being adjacent to the second leg of the one beam. The second wall is positioned in a plane parallel to the second leg of the one beam and being separated from the second leg by a gap. The second leg of an adjacent beam is positioned within the gap between the second leg of the one beam and the second wall of the slider cup, In this manner, when the mounting arms are mounted to a surface and the ladder is in a generally directly vertical orientation, extending the second ladder segment relative to the first ladder segment causes the second leg of the adjacent beam to slide within the gap formed by the slider cup and the ladder can be moved from a generally vertical orientation to an angled orientation of between at least 60 degrees and approximately 90 degrees measured from the horizontal.

Embodiments of the extendable ladder may include one or more of the following features. For example, the extendable ladder can move between the generally vertical orientation and an orientation that is between greater than 75 degrees and approximately 90 degrees measured from the horizontal. The extendable ladder can move between a generally vertical orientation and an orientation of between approximately 70 degrees and 75 degrees measured from the horizontal when the mounting arms are mounted to the surface.

The angle between the second leg and the first leg may be approximately 90 degrees. The beams may further include a third leg and the angle between the third leg and the first leg is approximately 90 degrees.

One or more of the beams and slider cups may made of aluminum. The slide cups may further include a fourth wall connected at a first edge and extending from the first wall in the direction of the second wall such that the gap is formed between a second edge of the fourth wall and the second wall. The fourth wall may have a third edge adjacent to the third wall and a fourth edge generally parallel to the third edge and being adjacent to the first wall.

The extendable ladder may further include one or more spacers mounted to the beams and configured to limit the movement of the second segment when extending the second segment relative to the first segment.

The mounting arms may be one or more of generally L-shaped, T-shaped, and linear. The mounting arms may be mounted to one or more of a vehicle, a building, and a piece of equipment. The vehicle may be one or more of a trailer, recreational vehicle, truck, and bus.

In another general aspect there is provided a method of using a ladder to obtain access to an upper portion of a vehicle. The method includes providing a ladder, pivoting the ladder, and extending the ladder. The ladder includes a first ladder segment, a second ladder segment, and at least two slider cups.

The first ladder segment includes two beams and each beam includes at least a first leg and a second leg with the first leg and the second leg being joined lengthwise to form an angle between the first leg and the second leg. One or more rungs are connected to and extend between the first leg of the first beam and the first leg of the second beam. One or more mounting arms extend from the beams with the mounting arms being configured at one end to be permanently mounted to a surface and being pivotally attached at another end to the beam whereby the beams can pivot with respect to the mounting arms to vary an angle formed between the mounting arm and the beam.

The second ladder segment includes two beams and each beam includes at least a first leg and a second leg with the first leg and the second leg being joined lengthwise to form an angle between the first leg and the second leg. One or more rungs are connected to and extend between the first leg of the first beam and the first leg of the second beam.

The slider cups are mounted to either or both of the first ladder segment and the second ladder segment and include a first wall and a second wall being positioned in parallel planes and connected by at least a third wall passing through a plane generally perpendicular to the first and second walls. The first wall is mounted to either or both of the first leg and the second leg of one beam with the third wall being adjacent to the second leg of the one beam. The second wall is positioned in a plane parallel to the second leg of the one beam and being separated from the second leg by a gap. The second leg of an adjacent beam is positioned within the gap between the second leg of the one beam and the second wall of the slider cup.

In this manner, when the mounting arms are mounted to a surface and the ladder is in a generally directly vertical orientation, extending the second ladder segment relative to the first ladder segment causes the second leg of the adjacent beam to slide within the gap formed by the slider cup and the ladder can be moved from a generally vertical orientation to an angled orientation of at least 60 degrees and approximately 90 degrees measured from the horizontal.

In the method, pivoting the ladder away from the vertical surface of the vehicle includes pivoting the ladder such that there is an angle of between greater than 60 degrees and approximately 90 degrees between the ladder and the vertical surface of the vehicle.

Extending the ladder includes extending the second ladder segment relative to the first ladder segment until the second ladder segment reaches the ground. Extending the second ladder segment causes the first beam of the second ladder segment to slide through the gap formed in the slider cup mounted to one or both of the first ladder segment and the second ladder segment.

Embodiments of the method may include one or more of the following features or those described above. For example, the mounting arms may be attached to a surface of the vehicle. One or more of the beams and the slider cups may be made of aluminum.

The ladder may be moved away from the vertical surface of the vehicle such that there is an angle of between approximately 75 degrees and 90 degrees from the horizontal.

Storing the ladder may include moving the second ladder segment relative to the first ladder segment to decrease a total length of the extended ladder and so doing cause the first beam of the second segment to slide through the gap formed in the slider cup mounted to one or both of the first ladder segment and the second ladder segment.

In another general aspect there is provided a vehicle to which the extendable ladder disclosed herein is mounted with the mounting arms being mounted to a vertical surface of the ladder. Embodiments of the vehicle may include one or more of the features described above. For example, the vehicle may include one or more of a truck, trailer, recreational vehicle, and bus.

The details of various embodiments of the invention are set forth in the accompanying drawings and the description below. Other features and advantages of the invention will be apparent from the description, drawings, and claims. For example, the extendable ladder described herein generally advantageously may allow the first segment and the second segments of the ladder to slide past each other easily without binding or catching even while at a steep angle.

DESCRIPTION OF THE DRAWINGS

FIG. 1 is a side view of an extendable, slidable step ladder.

FIG. 2 is a perspective view of front view the extendable, slidable step ladder of FIG. 1.

FIG. 3 is a cross-sectional side view of one beam of the extendable, slidable step ladder of FIG. 2 taken at section line 3-3.

DETAILED DESCRIPTION

Figure 4:
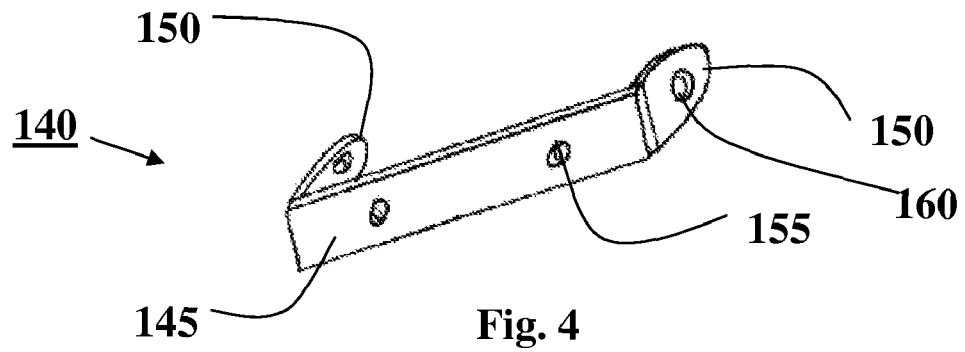
FIG. 4 is a perspective view of a first implementation of a mounting arm for an extendable, slidable step ladder.

The inventor has developed an extendable ladder that has one or more of the following components: (1) a pivoting mounting arm for mounting the ladder to a surface of an object such as the side of a building, trailer or RV such that the ladder can be at an angle to the object when the ladder is extended and pulled away from the object at its base; (2) at least two segments that can be climbed—a first segment that is fixed to the mounting arms and a second segment that slides over the first segment to extend the length of the ladder to the ground; and (3) slider cups that mount to the first and second segments of the ladder to allow the second segment to slide freely while limiting movement of the second segment away from the first segment.

As used herein a ladder and a step or stair have different meanings. A ladder is made up of a pair of side rails joined by rungs and may be used at an angle of up to 22 degrees from the surface against which it leans or is mounted. These meanings are consistent with those known and used in the art. For example, the Occupational Safety and Health Administration (OSHA) have defined ladders as being used at an angle to the horizontal of between 60 degrees and 90 degrees. However, the range of 60 degrees to 75 degrees from the horizontal is considered to result in a substandard fixed ladder and therefore is not desirable:

"Substandard fixed ladders are permitted only where it is found necessary to meet conditions of installation. This substandard pitch range shall be considered as a critical range to be avoided, if possible."

See 21 CFR 1910.27(e) (2007). Thus the range of use for fixed ladders should in the range of between 60 degrees and 90 degrees measured from the horizontal, and, more particularly, between 75 degrees and 90 degrees measure from the horizontal. Under 29 CFR 1910.21(c)(1) a ladder is defined as "an appliance usually consisting of two side rails joined at regular intervals by cross-pieces called steps, rungs, or cleats, on which a person may step in ascending or descending."

In contrast, as described above a step or stair is at an angle of between 30 and 50 degrees from the horizontal for fixed stairs and 55 and 60 degrees for portable stairs. Under 29 CFR 1910.21(b)(8), "Stairs, stairway" is defined as a "series of steps leading from one level or floor to another, or leading to platforms, pits, boiler rooms, crossovers, or around machinery, tanks, and other equipment that are used more or less continuously or routinely by employees, or only occasionally by specific individuals. A series of steps and landings having three or more risers constitutes stairs or stairway."

Referring to FIGS. 1 and 2, an extendable step ladder 100 for mounting to a surface 103 of a vehicle, wall, piece of equipment, building or the like includes a first ladder segment 105 and a second ladder segment 110 which are slidably mounted together using slider cups 115. The slider cups 115 are configured with slots, described in greater detail below, to allow the second segment 110 to slide adjacent to the first segment 105 to extend the length of the ladder or retract the second segment back up against the first segment. One or more spacers 117 are attached to either or both of the first and second ladder segments. The spacers 117 limit the movement of the second segment when extending the second segment.

The first segment 105 further includes one or more mounting arms 120 to mount the ladder to the surface 103, a hand rail 125 for a person to hold onto while climbing the ladder, one or more rungs or steps 127 for climbing the ladder and two beams 128 connect by the rungs. The mounting arms 120 may be pivotally attached to the beams 128 with, for example, pins 130 such that the first segment can pivot with respect to the mounting arms. In this manner if the mounting arms are attached or otherwise mounted to the wall 103 the ladder 100 can be pivoted away from the wall. The ability to pivot the ladder away from the wall improves ease of use and safety of the ladder because the angle of the ladder will no longer be vertical. A person climbing the ladder therefore can more easily climb the ladder and access the roof of the vehicle or other surface at the top of the ladder with less concern about falling back from the ladder. The ladder can be pivoted away from the surface up to between approximately 20 degrees and approximately 25 degrees, and more particularly, approximately 22 degrees. Thus the ladder is configured to be stored in a generally vertical orientation and moved outwardly up to approximately 22 degrees to be used.

The second ladder segment 110 includes rungs or steps 127 for climbing the ladder, beams 128 connected to the rungs, and handles 133 for lifting the second ladder segment and sliding it along the first ladder segment.

Referring also to FIG. 3, which shows the cross-sectional profile of the beams, the beams 128 of both the first and the second ladder segments are made from a C-shaped bar 200 with a pair of side walls or first wall and second wall 205, 206 and a base or third wall 210, all of which extend the entire length of the beam. The side walls 205, 206 are separated by a gap or slot 213. In the arrangement of the first and second ladder segments 105 and 110, respectively, the side wall 205 of the beam 128 of the first ladder segment is adjacent to a side wall 205 of an adjacent beam 128 on the adjacent, second ladder segment 110 such that only the side walls 205 will slide through the slot in the slider cups.

As note above, FIG. 3 shows a cross-section cutout of the second segment 110 illustrating the segment in cross section as being made from a C-shaped bar. The C-shaped bar can be, for example, aluminum, a lightweight alloy, or other lightweight, strong material. It is expected that the gap 213 can be varied depending upon the stock of material used to form the ladder segments. In one embodiment, the C-shaped bar has dimensions as follows: side wall 205, approximately one inch in length and ⅛ inch in thickness; side wall 206, approximately one inch in length and ⅛ inch in thickness; and base wall 210, approximately two inches in length and ⅛ inch in thickness. Other dimensions are expected to be functional.

Figure 5:
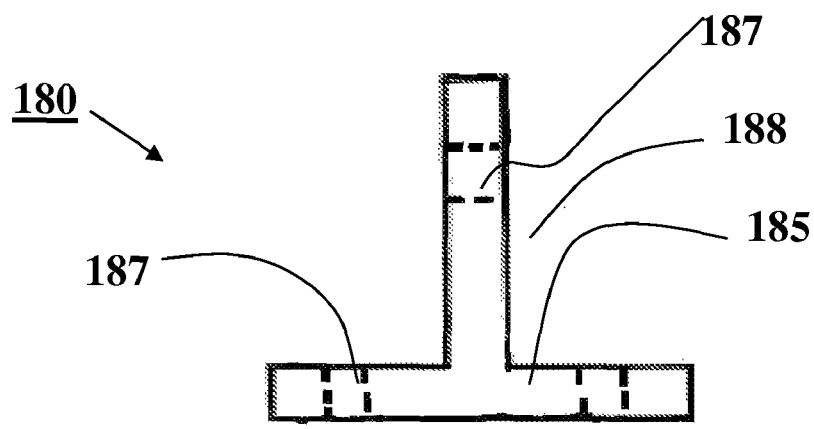
FIG. 5 is a side view of a second implementation of a mounting arm for an extendable, slidable step ladder.
Figure 6:
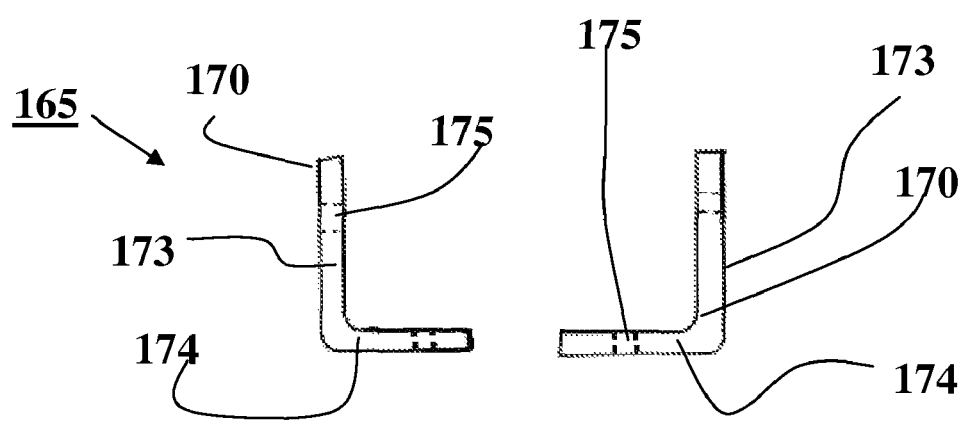
FIG. 6 is a side view of a third implementation of a mounting arm for an extendable, slidable step ladder.

Referring to FIGS. 4-6, the mounting arms 120 can be arranged in any number of configurations such that the ladder can be pivoted away from a wall. For example, as illustrated in FIG. 4, a mounting arm 140 may be a single piece that includes a base 145 and two extensions 150. The base 145 may have one or more openings 155 for mounting to the wall and each extension 150 may have an opening 160 for mounting to the ladder. As illustrated in FIG. 5, a mounting arm system 165 may include a pair of L-shaped brackets 170 with angled arms 173, 174 each having an opening 175 to mount to the wall or the first segment. The L-shaped brackets may be symmetrical (i.e., each arm 173 is the same dimension as the connected arm 174) such that there is no inherent orientation for using the brackets. Alternatively, one of arms 173 or 174 may be longer to allow a greater distance to exist between the ladder and the surface to which the ladder is mounted. Referring to FIG. 6, in a modification of the L-shaped bracket mounting arm system 165 of FIG. 5, a bracket 180 includes a wider base 185 with two openings 187 for mounting to the wall or surface. An arm 188 extends from the base 185 for mounting to one beam 128 of the ladder through a third opening 187. It is expected that two such brackets 180 will be used with each ladder.

Referring to FIGS. 7-10, the slider cups 115 are configured to allow the first ladder segment 105 and the second ladder segment 110 to slide past each other without binding or catching while keeping the segments from separating apart. The slider cups 115 have one or more side walls 215 (which may also be referred to as the fourth wall and/or fifth wall of the slider cup), a rear wall 220 (which may also be referred to as the first wall of the slider cup), a retaining wall 225 (which may also be referred to as the second wall of the slider cup), and a top 230 (which may also be referred to as the third wall of the slider cup). The side walls, to the extent they are present, may have a section removed from them to form a slot or gap 235 adjacent to the retaining wall 225. The slider cups are mounted to the ladder segments such that the slot 235 surrounds the side wall 205 of the ladder segment to which the slider cup is mounted as well as leaves a space for including one of the side walls 205 of the other ladder segment. In one embodiment, the slider cup 115 has a length of 4 inches, a wall 230 that extends 1 and ½ inches in the beam and a pair of ⅜ inch by 1 and ½ inch pieces mounted to each side. The wall extends to approximately ¼ inches from the wall 206.

The clearance between the retaining wall 225 and side walls 215 formed by the slot or gap has an important role in allowing the first and second ladder segments to slide past each other. In particular, if the ladder segments and/or slider cups are made from aluminum, which allows the ladder to be lightweight, the ladder segments may bind against each other when sliding one segment past the other segment because aluminum is a soft metal. In one embodiment of the slider cups, the distance or gap between the wall 206 and the rear wall 220 may be approximately ¼ inches. The distance or gap between the slider cup top 230 and the side wall 206 is approximately ⅛ inches. The distance or gap between the slider cup wall 223 and the side wall 205 is approximately ⅛ inches. The gap between the base wall 210 and the end of the slider cup wall 223 at a position adjacent to the base wall 210 is ⅛ inches.

The slider cups 115 may be constructed in a number of manners. In one implementation, the slider cup may be made from a section of the C-shaped bar used to form the ladder segments. This implementation can reduce material costs because the same stock material can be used for a variety of purposes. The C-shaped bar is cut along its cross section to form a piece with two cut edges, the rear wall 220, the retaining wall 225, and the top 230. A piece of metal may be welded against or otherwise attached to the cut bar on each of the cut edges. The piece of metal may be dimensioned such that the slot 235 is formed with its correct dimensions. The slider cup 115 then is welded to the ladder segment with one of the side walls being positioned within the slot.

Figure 7:
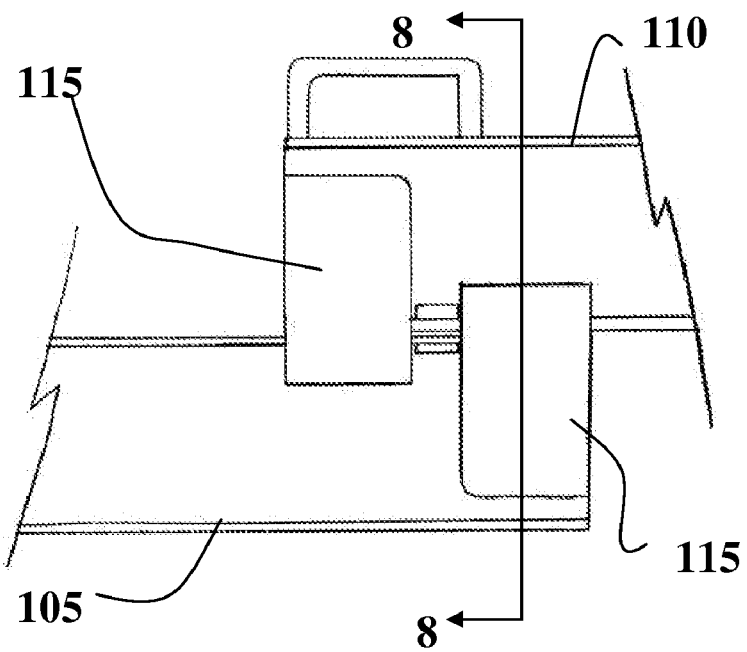
FIG. 7 is a side view of a pair of slider cups for the extendable slidable step ladder of FIG. 1.
Figure 8:
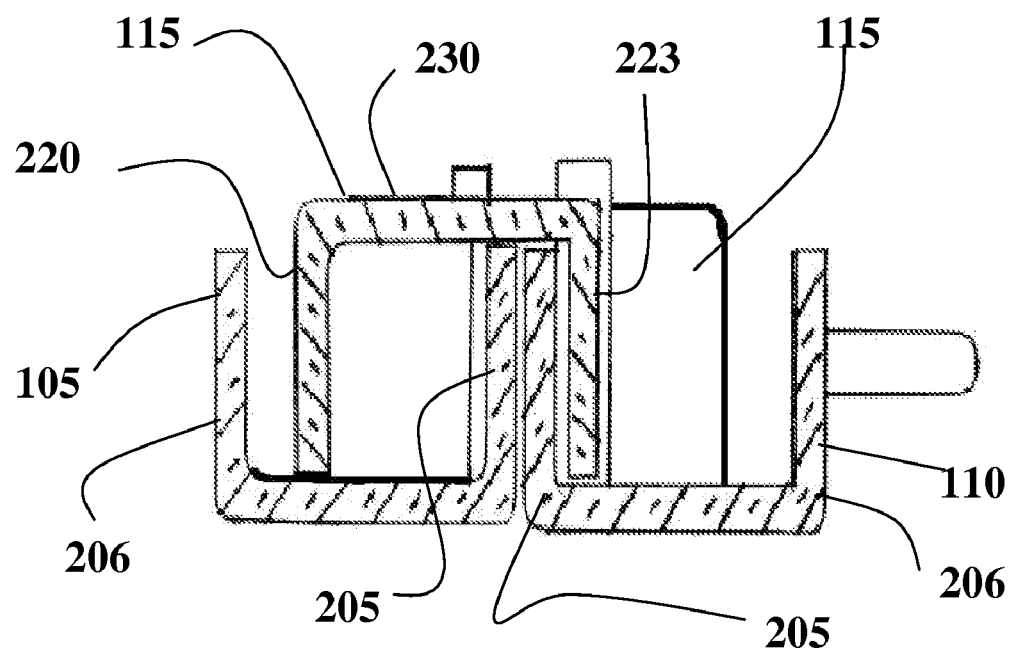
FIG. 8 is a cross-sectional side view of the slider cps of FIG. 7 taken at section line 8-8.
Figure 9:
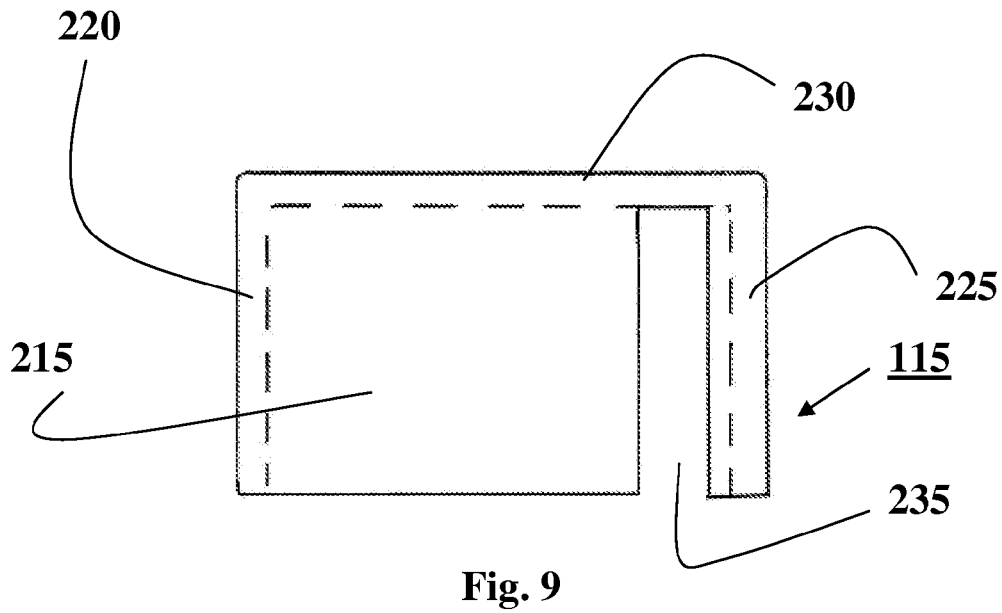
FIGS. 9 and 10 are side and bottom views, respectively, of the slider cups of FIG. 7.
Figure 10:
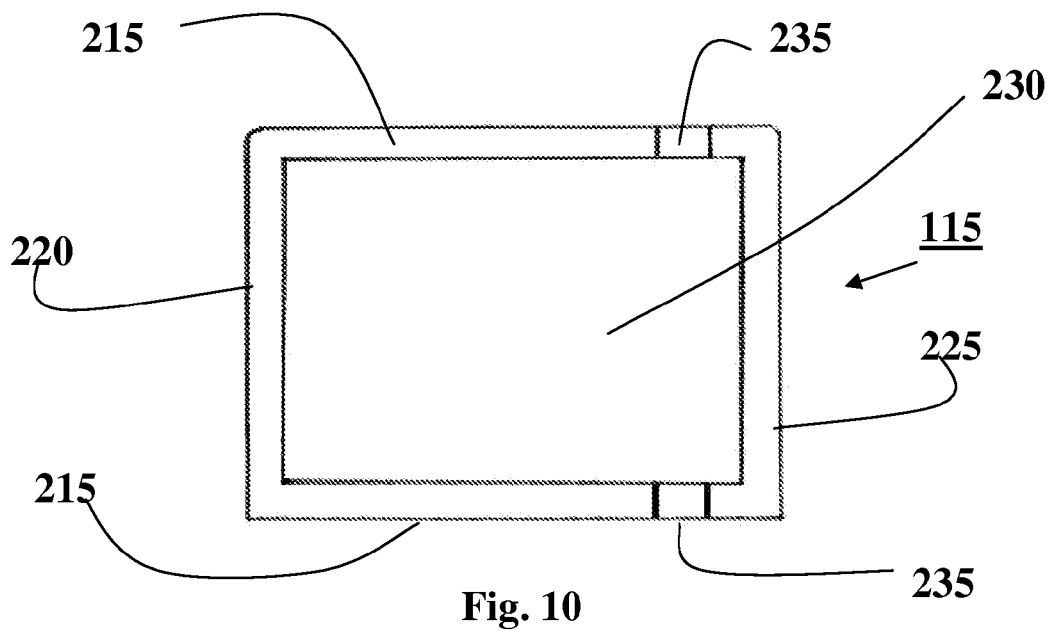

As illustrated in FIGS. 1 and 7 the slider cups 115 are attached to the ladder segments in an offset manner such that the rear wall 220 of the slider cup is closely adjacent to the outer side wall of the ladder segment and the retaining wall 225 is positioned beyond the outside of the ladder segment to which the slider cup is attached. In this manner, the inner side wall of both the ladder segment and the adjacent ladder segment fit within the slot adjacent to the retaining wall. During manufacture, the slider cup can be shifted within the ladder segment to vary the distance between the ladder segment and the retaining wall. If a separate piece, sheet, or strip of metal is used to form the slot, that piece, sheet or strip would be sized to provide the appropriately sized slot and then mounted to the slider cup.

In the slider cup 115, the side walls function, in part, to provide a secure and strong attachment of the slider cup to the ladder segment. If the base of the rear wall of the slider cup were to be the only surface of the slider cup used to affix the slider cup to the ladder, there could be a lack of sufficient strength in the bond between the slider cup and the ladder. An insufficiently strong bond could allow the slider cup to snap off of the ladder segment during regular use of the ladder. The side walls provide additional attachment strength between the slider cup and ladder segment.

Figure 11:
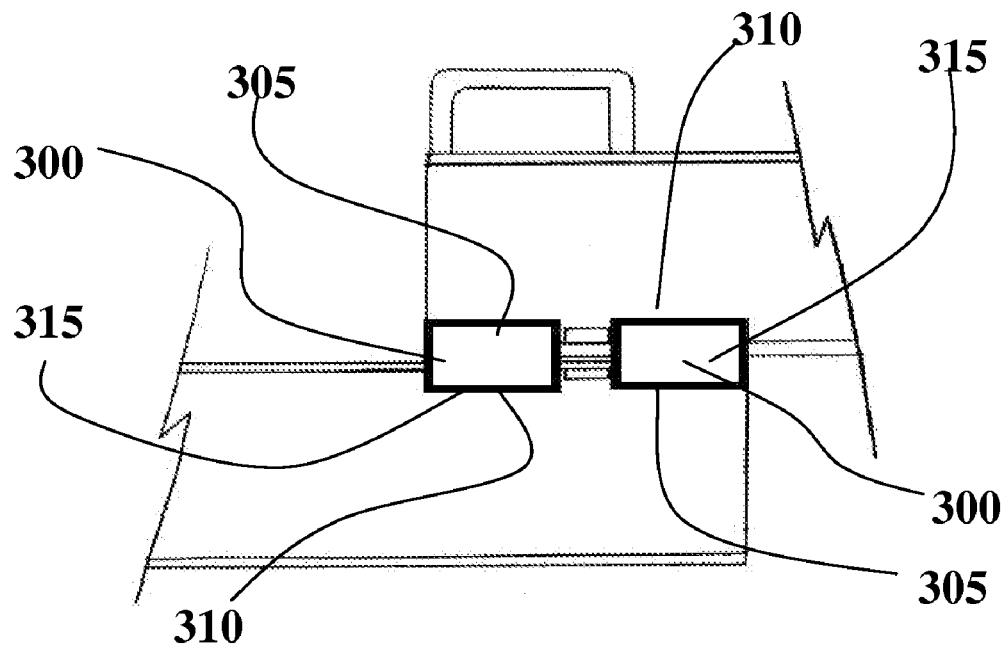
FIGS. 11 and 12 are front and cross-sectional side views of a second implementation of a pair of slider cups for an extendable, slidable step ladder.
Figure 12:
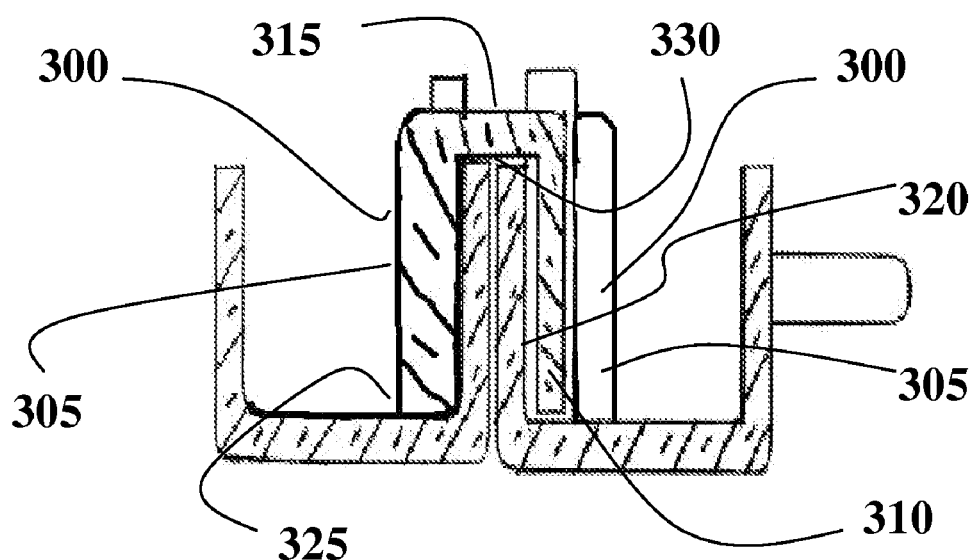
Figure 13:
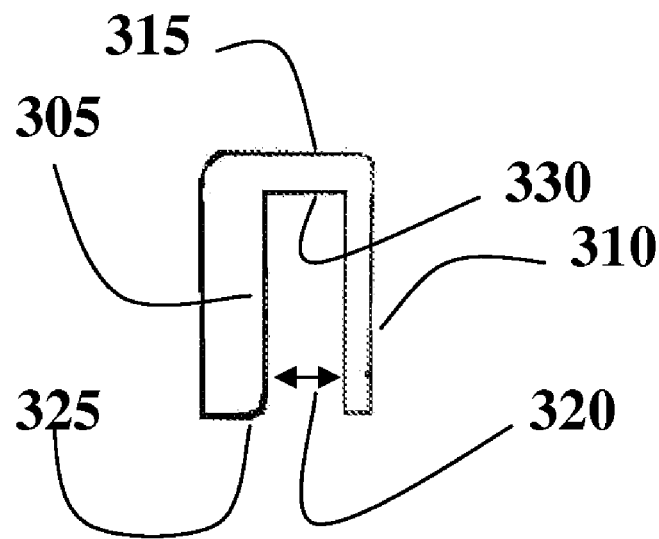
FIG. 13 is a side view of the slider cup of FIGS. 11 and 12.

Referring to FIGS. 11-13, in another implementation, slider cups 300 are formed from a narrower C-shaped bar. The slider cup 300 includes a rear wall 305, a retaining wall 310, a top wall 315, and a gap 320. The rear wall 305 includes a bottom surface 325 and the top wall 315 includes an inner surface 330. The gap 320 may be significantly less than the gap 213 such that an additional piece of metal mounted as a side wall is unnecessary to provide attachment strength. For example, both the bottom surface 325 and the inner surface 330 may be attached to the ladder segment. The bottom surface may be welded to the base of the ladder segment, the inner surface may be welded to the outer surface of one side wall of the ladder segment, and the retaining wall 310 is sufficiently far away from the side wall that the side wall of the adjacent ladder segment can easily slide within the gap that is beyond the ladder segment. This attachment should provide sufficient strength to prevent the slider cup 300 from becoming loosened from the ladder segment during use.

Figure 14:
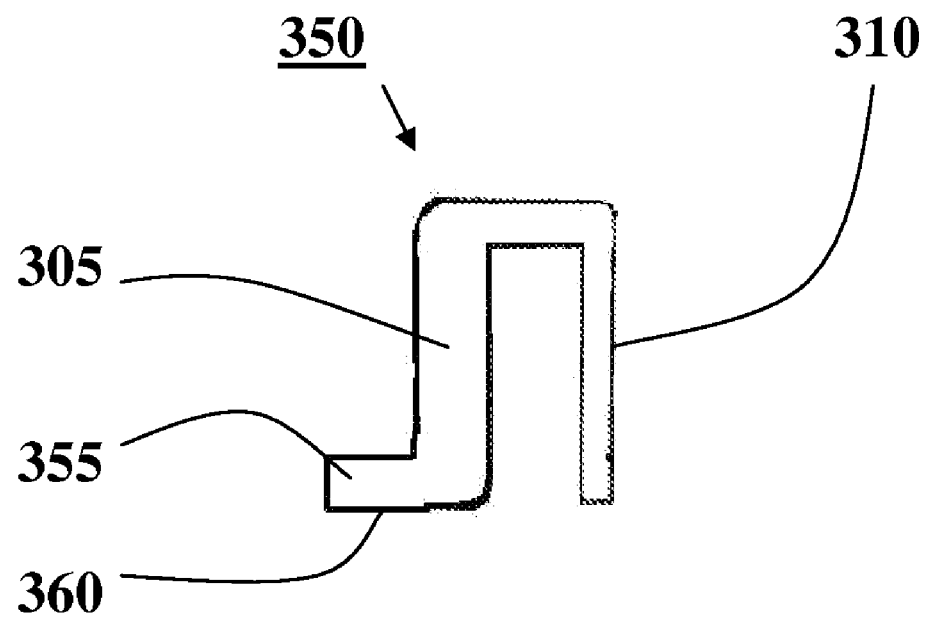
FIG. 14 is a side view of a third implementation of a slide cup.

Referring to FIG. 14, in another implementation, a slider cup 350 differs from the slider cup 300 by the addition of a base section 355 that extends perpendicularly from the rear wall 305 to improve the bonding strength of the slider cup 350 when it is attached to a ladder segment. The additional bonding strength is provided by the additional bottom surface area 360 added by the base section 355. The base section can extend in either or both directions from the rear wall, although FIG. 14 illustrates the base section extending from only one direction. The base section can be welded, bolted, or otherwise affixed to the ladder segment. Similarly, the rear wall can be welded, bolted, or otherwise affixed to a side wall of the ladder segment. It should be noted that the slider cup of FIG. 14 can be modified by increasing a gap between the walls 305 and 310 while reducing the base section 355. As those changes are made, the slide cup resembles an embodiment of the slider cup 115.

It should be evident that the extendable ladders described herein are suitable for a variety of purposes, such as mounting to a vehicle, building, or piece of equipment. The mounting arms may be attached to a surface of a trailer, recreational vehicle, bus, or truck. The ladder will be stored in a generally vertical orientation and then pivoted outward to use the ladder to access the top of the vehicle or an upper portion of the vehicle. The ladder may be used as an emergency ladder in a high rise building. As is known in the art, emergency escapes from buildings typically do not extend all the way to the ground floor because that would provide an easy access for burglars to enter the building. The ladders described herein can be used at the first floor as a means to access the ground. In this implementation, the ladder may be stored in a horizontal orientation and then allowed to swing downward and extend to reach the ground.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

What is claimed is:

1. An extendable ladder configured to extend a second ladder segment relative to a first ladder segment, the ladder comprising:

the first ladder segment comprising a first beam and a second beam, wherein each of the first beam and the second beam comprises at least a first leg and a second leg with the first leg and the second leg being joined lengthwise to form an angle between the first leg and the second leg, one or more rungs connected to and extending between the first leg of the first beam and the first leg of the second beam, and one or more mounting arms extending from either or both of the first and second beams one end to the first or second beam and the one or more mounting arms configured at another end to be permanently mounted to a surface whereby the beams can pivot with respect to the one or more mounting arms to vary an angle formed between the one or more mounting arms and the beams;

the second ladder segment comprising a third and fourth beam, wherein each of the third beam and the fourth beam respectively comprises at least a first leg and a second leg with the first leg and the second leg of the third beam being joined lengthwise to form an angle and the first leg and the second leg of the fourth beam being joined lengthwise to form an angle, and one or more rungs connected to and extending between the first leg of the third beam and the first leg of the fourth beam; and at least two slider cups, a first slider cup being mounted to the first beam and a second slider cup being mounted to the second or third beam, wherein each of the first and second slider cups respectively comprises a first wall and a second wall being positioned in parallel planes and directly connected by at least a third wall passing through a plane generally perpendicular to the first and second walls, the first wall of the first slider cup being mounted to either or both of the first leg and the second of the first beam, the third wall of the first slider cup being adjacent to the second leg of the first beam, and the first wall of the first slider cup being positioned in a plane parallel to the second leg of the first beam and being separated from the second wall of the first slider cup by a first gap created by a space between the first wall and the second wall of the first slider cup, whereby the second leg of the third beam and the second leg of the first beam are positioned within the first gap, the slider cups respectively further comprise a fourth wall that is directly connected at a first edge to the first wall and that extends from the first wall in a direction toward the second wall and a second edge of the fourth wall so that the first gap of the first slider cup and a second gap of the second slider cup is formed between the second edge of the fourth wall and the second wall, the fourth wall further has a third edge directly attached to the third wall and a fourth edge generally parallel to the third edge and adjacent to the first wall;

whereby the ladder can be moved from a generally vertical orientation to an angled orientation of between at least 60 degrees and approximately 90 degrees measured from a horizontal orientation, and whereby extending the second ladder segment from the first ladder segment causes the second leg of the third beam to slide within the first gap.

2. The extendable ladder of claim 1, wherein the ladder can move between the generally vertical orientation and an orientation that is between greater than 75 degrees and approximately 90 degrees measured from the horizontal orientation.

3. The extendable ladder of claim 1, wherein the ladder can move between a generally vertical orientation and an orientation of between approximately 70 degrees and 75 degrees measured from the horizontal orientation when the mounting arms are mounted to the surface.

4. The extendable ladder of claim 1, wherein the angle between the second leg of the first beam and the first leg of the first beam is approximately 90 degrees.

5. The extendable ladder of claim 1, wherein one or more of the first, second, third, and fourth beams further comprise a third leg and an angle formed between the third leg and the first leg the corresponding beam is approximately 90 degrees.

6. The extendable ladder of claim 1, wherein one or more of the beams and the slider cups comprise aluminum.

7. The extendable ladder of claim 1, wherein the one or more mounting arms are one or more of a generally L, T and linear shape.

8. The extendable ladder of claim 1, further comprising one or more spacers mounted to the beams and configured to limit the movement of the second segment when extending the second segment.

9. The extendable ladder of claim 1, wherein the one or more mounting arms are mounted to a vehicle, a building, or a piece of equipment.

10. The extendable ladder of claim 9, wherein the vehicle comprises a trailer, recreational vehicle, truck, or bus.

11. A method of using an extendable ladder to obtain access to an upper portion of a vehicle, the method comprising:

providing an extendable ladder, the extendable ladder comprising:

a first ladder segment comprising a first beam and a second beam wherein each of the first beam and the second beam comprise at least a first leg and a second leg with the first leg and the second leg being joined lengthwise to form an angle between the first leg and the second leg, one or more rungs connected to and extending between the first leg of the first beam and the first leg of the second beam, and one or more mounting arms extending from either or both of the first and second beams and pivotally attached at one end to the first or second beam and the one or more mounting arms configured at another end to be permanently mounted to a surface whereby the beams can pivot with respect to the one or more mounting arms to vary an angle formed between the one or more mounting arms and the beams;

the second ladder segment comprising a third and fourth beam, wherein each of the third beam and the fourth beam respectively comprises at least a first leg and a second leg with the first leg and the second leg of the third beam being joined lengthwise to form an angle and the first leg and the second leg of the fourth beam being joined lengthwise to form an angle, and one or more rungs connected to and extending between the first leg of the third beam and the first leg of the fourth beam; and at least two slider cups, a first slider cup being mounted to the first beam and a second slider cup being mounted to the second or third beam, wherein each of the first and second slider cups respectively comprises a first wall and a second wall being positioned in parallel planes and directly connected by at least a third wall passing through a plane generally perpendicular to the first and second walls, the first wall of the first slider cup being mounted to either or both of the first leg and the second of the first beam, the third wall of the first slider cup being adjacent to the second leg of the first beam, and the first wall of the first slider cup being positioned in a plane parallel to the second leg of the first beam and being separated from the second wall of the first slider cup by a first gap created by a space between the first wall and the second wall of the first slider cup, whereby the second leg of the third beam and the second leg of the first beam are positioned within the first gap, the slider cups respectively further comprise a fourth wall that is directly connected at a first edge to the first wall and that extends from the first wall in a direction toward the second wall and a second edge of the fourth wall so that the first gap of the first slider cup and a second gap of the second slider cup is formed between the second edge of the fourth wall and the second wall, the fourth wall further has a third edge directly attached to the third wall and a fourth edge generally parallel to the third edge and adjacent to the first wall;

whereby the ladder can be moved from a generally vertical orientation to an angled orientation of between at least 60 degrees and approximately 90 degrees measured from a horizontal orientation, and whereby extending the second ladder segment from the first ladder segment causes the second leg of the third beam to slide within the first gap.

12. A vehicle comprising the extendable ladder according to claim 1, wherein the one or more mounting arms are mounted to a surface of the ladder.

13. The vehicle of claim 12, wherein the vehicle comprises a truck, trailer, recreational vehicle, or bus.

14. The extendable ladder of claim 1, wherein the first wall of the second slider cup is mounted to either or both of the first leg and the second leg of the second beam, the third wall of the second slider cup is adjacent to the second leg of the second beam and the first wall of the second slider cup is positioned in a plane parallel to the second leg of the second beam, the first wall of the second slider cup being separated from the second wall of the second slider cup by the second gap, whereby the second leg of the fourth beam and the second leg of the second beam are positioned within the second gap, whereby extending the second ladder segment from the first ladder segment causes the second leg of the fourth beam to slide within the second gap.

15. The extendable ladder of claim 1, wherein the first wall of the second slider cup is mounted to either or both of the first leg and the second leg of the third beam, the third wall of the second slider cup is adjacent to the second leg of the second beam and the first wall of the second slider cup is positioned in a plane parallel to the second leg of the third beam, the first wall of the second slider cup being separated from the second wall of the second slider cup by the second gap, whereby the second leg of the first beam and the second leg of the third beam are positioned within the second gap, whereby extending the second ladder segment from the first ladder segment causes the second leg of the first beam to slide within the second gap.

16. The extendible ladder of claim 15, further comprising a third slider cup and a fourth slider cup, wherein each of the third and fourth slider cups comprises a first wall and a second wall being positioned in parallel planes and connected by at least a third wall passing through a plane generally perpendicular to the first and second walls of the third and fourth slider cups respectively, wherein the first wall of the third slider cup is mounted to either or both of the first leg and the second leg of the second beam, the third wall of the third slider cup is adjacent to the second leg of the second beam and the first wall of the third slider cup is positioned in a plane parallel to the second leg of the second beam, the first wall of the third slider cup being separated from the second wall of the third slider cup by a third gap created by a space between the first wall and the second wall of the third slider cup, whereby the second leg of the fourth beam and the second leg of the second beam are positioned within the third gap, the first wall of the fourth slider cup is mounted to either or both of the first leg and the second leg of the fourth beam, the third wall of the fourth slider cup is adjacent to the second leg of the fourth beam and the first wall of the fourth slider cup is positioned in a plane parallel to the second leg of the fourth beam, the first wall of the fourth slider cup being separated from the second wall of the fourth slider cup by a fourth gap created by a space between the first wall and the second wall of the fourth slider cup, whereby the second leg of the second beam and the second leg of the fourth beam are positioned within the fourth gap whereby extending the second ladder segment from the first ladder segment causes the second leg of the fourth beam to slide within the third gap and causes the second leg of the second beam to slide within the fourth gap.

17. The extendable ladder of claim 1, wherein the second leg of each of the first beam, second beam, third beam and fourth beam have a continuous surface along a length of the second legs respectively.

18. The extendible ladder of claim 16, wherein the second leg of each of the first beam, second beam, third beam and fourth beam have a continuous surface along a length of the second legs respectively.

* * * * *